INVENTORS.
EVON C. GREANIAS
ARTHUR HAMBURGEN
BY Paul M. Brannen
AGENT

April 19, 1966 E. C. GREANIAS ETAL 3,247,485

CHARACTER RECOGNITION SYSTEM

Original Filed Dec. 30, 1957 4 Sheets-Sheet 2

| | | | | |
|---|---|---|---|---|
| 1B | A2 | B1 | E2 | E3 |
| 2B | A7 | B6 | C5 | D4 |
| 3B | A7 | B7 | D7 | E7 |
| W | A5 | A6 | E5 | E6 |

| | | | | |
|---|---|---|---|---|
| 1B | B1 | D3 | E1 | E2 |
| 2B | C4 | D3 | D4 | E2 |
| 3B | A6 | B7 | E5 | E6 |
| W | A2 | A3 | A5 | B4 |

| | | | | |
|---|---|---|---|---|
| 1B | A4 | B3 | C2 | D1 |
| 2B | A5 | B5 | C5 | D5 |
| 3B | D3 | D5 | D8 | D7 |
| W | A3 | B2 | B1 | C1 |

| | | | | |
|---|---|---|---|---|
| 1B | A1 | A2 | A3 | E1 |
| 2B | B3 | C3 | D3 | E4 |
| 3B | A6 | B7 | D7 | E6 |
| W | A4 | B4 | E2 | E3 |

| | | | | |
|---|---|---|---|---|
| 1B | A3 | A4 | A5 | B2 |
| 2B | A4 | A5 | C4 | D4 |
| 3B | A6 | B7 | D7 | E6 |
| W | A2 | B1 | E2 | E3 |

| | | | | |
|---|---|---|---|---|
| 1B | A1 | B1 | E1 | E2 |
| 2B | C5 | C6 | C7 | D4 |
| 1W | B7 | C4 | E5 | E6 |
| 2W | A7 | B7 | D7 | E7 |

| | | | | |
|---|---|---|---|---|
| 1B | A2 | A3 | E2 | E3 |
| 2B | A5 | A6 | D7 | E6 |
| 3B | A5 | B4 | C4 | D4 |
| W | A4 | B2 | D6 | E4 |

| | | | | |
|---|---|---|---|---|
| 1B | B4 | C4 | E2 | E3 |
| 2B | A2 | A3 | B1 | B4 |
| 3B | B7 | D6 | E4 | E5 |
| W | A5 | A6 | D7 | E6 |

| | | | | |
|---|---|---|---|---|
| 1B | A2 | B1 | E2 | E3 |
| 2B | A5 | A6 | D7 | E6 |
| 3B | A4 | A5 | E3 | E4 |
| W | B4 | C4 | C5 | D4 |

| | | | | |
|---|---|---|---|---|
| 1B | B2 | C1 | C2 | C3 |
| 2B | C4 | C5 | C6 | C7 |
| 1W | A1 | A7 | B1 | B7 |
| 2W | D1 | D7 | E1 | E7 |
| 3W | A3 | A4 | A5 | B5 |

April 19, 1966 E. C. GREANIAS ETAL 3,247,485

CHARACTER RECOGNITION SYSTEM

Original Filed Dec. 30, 1957 4 Sheets-Sheet 4

United States Patent Office 3,247,485
Patented Apr. 19, 1966

3,247,485

CHARACTER RECOGNITION SYSTEM

Evon C. Greanias, Chappaqua, and Arthur Hamburgen, Endicott, N.Y., assignors to International Business Machines Corporation, New York, N.Y., a corporation of New York Original application Dec. 30, 1957, Ser. No. 706,087, now Patent No. 3,105,956, dated Oct. 1, 1963. Divided and this application June 24, 1963, Ser. No. 289,913
5 Claims. (Cl. 340—146.3)

This invention relates to character recognition systems, and particularly to an improved character recognition system employing matching techniques which utilize electronic components and circuits to achieve high speed character recognition with a relatively small amount of apparatus, and without recourse to slow or unwieldy arrangements for compensating for misalignment of characters with respect to the scanning devices.

This application is a division of application Serial No. 706,087, filed on December 30, 1957, by E. C. Greanias and A. Hamburgen, now Patent No. 3,105,956.

The primary object of this invention is to provide an improved character recognition system.

One of the most basic sources of information in the business or scientific fields is a printed document. The information in these documents is normally transcribed manually into some media, such as punched cards or tape so as to be suitable for machine use. In the present invention the information on the document in the form of characters is scanned by suitable apparatus to produce signal patterns which are then analyzed to identify the character scanned.

Various systems have previously been proposed for sensing characters such as printed or otherwise formed letters on material. Such characters may be alphabetic letters, numerals or various special symbols. Some of the earlier arrangements for sensing characters involved the use of a beam of light which progressively traverses the character and causes the characteristics of the area traversed to control the operation of a light sensitive device of variation in reflected or transmitted light. The logic arrangements used in these systems to identify the character was generally dependent upon the times during which certain unique portions of the character were sensed by the scanning beam. Such systems are relatively slow and are limited to the sensing of characters which are properly positioned in relation to the scanning beam and in many instances such characters had to be specially formed. Other attempts were made along similar lines utilizing characters which were specially formed to include a code mark in the vicinity of the character with character recognition being accomplished by sensing the code mark or marks rather than the character itself. Although this provides a relatively simple means of identifying characters, such arrangements have seen little use in view of the fact that special printing equipment was required to print characters of this type and in many instances the printing is not suitable from an appearance standpoint because of the code marks.

Still another approach to character recognition involves a mechanical mask matching technique. In such arrangements, the image of the character is compared with suitable masks usually provided on an opaque disc and arranged so that a photocell detects the matching of the character image and the mask on the disc to then provide an output signal indicative of the identity of the character.

Still other character recognition systems are arranged to scan a character to be recognized and to then derive a suitable coded information from the scanning information, which coded information is then analyzed by suitable circuits to determine whether or not a particular character has been scanned. These arrangements are useful in situations where misalignment of printing occurs, since they thereby make is possible to reduce the amount of information which must be analyzed in order to completely scan the entire area in which the character may appear.

The present invention differs from the arrangements previously proposed in that the characters are scanned by suitable scanning means as they are fed past a scanning station by a document transport system, and the scanning information is provided in its original form, in which it represents actual information derived from the scanning of a character, rather than an encoded or reduced form. This information is then supplied to a suitable matrix in which the information is shifted through the matrix in synchronism with the motion of the character past the scanning device, with suitable logic circuit means connected to the storage matrix so that, when the character information occupies a predetermined arrangement of storage positions, an output circuit will be energized to provide an indication of the character scanned.

Since the storage matrix can be operated at electronic speeds to shift the character information through various possible configurations, it is possible to use this dynamic comparison arrangement at relatively high speeds compared with previously known systems.

The characters to be recognized may appear in different forms, such as for example, graphic characters printed on paper or record cards. In the case of printed characters, these characters may be scanned by suitable light beam scanning devices in which there is provided a photomultipler which is responsive to varying degrees of light reflected from the document during the scanning operation. Also, image dissecting apparatus could be used wherein successive portions of the character would be presented to the photomultiplier or light sensitive device, the character itself being fully illuminated. Either serial or parallel scanning may be employed, parallel scanning in the case of printed characters being provided by utilizing a plurality of photoresponsive devices arranged in a line transverse to the motion of the document to be scanned, with suitable slits or apertures so that the light which reaches each photoconductive device reflects the scanning of a small portion of the character, with a plurality of adjacent portions being scanned simultaneously.

The invention is not limited to use with optical scanning devices for scanning printed characters by transmitted or reflected light, but is also applicable to the scanning of magnetic characters, that is, characters formed in such manner as to include a magnetizable or magnetized substance in the character configuration, and wherein parallel scanning pickup or sensing heads are arranged so that, as the magnetized or magnetizable character passes thereunder, the change in the magnetic field conditions caused by the magnetic portions of the character will provide signals which will then be analyzed by the subsequent portion of the system.

Another object of the present invention is to provide a character recognition system capable of recognizing a complete set of alphanumeric characters in a large number of different type fonts.

Another object of the invention is to provide an improved character recognition system for recognizing either conventionally printed or magnetic characters and providing output signals indicative of the characters recognized in accordance with patterns of information derived from scanning the characters.

Another object of the invention is to provide a character recognition system in which the characters are serially scanned in a plurality of scans to provide signals during the intervals that a portion of a character is sensed, and thereafter advancing such scanning information through a suitable storage matrix in which various combinations of scanning information will produce output signals indicative of the character scanned.

Still a further object of the invention is to provide a character recognition system in which the characters to be recognized are scanned and the information derived therefrom is supplied to a storage matrix by means synchronized with the scanning, whereafter the information is advanced through the storage matrix in synchronism with the scanning means and various combinations of information are determined at preselected points in the matrix by suitable logic circuits to provide an output indicative of the character scanned.

Yet another object of the invention is to provide a character recognition system in which the character to be recognized is scanned and the information derived therefrom is supplied to a two dimensional storage matrix by means synchronized with the scanning, and wherein the information in the two dimensional storage matrix is advanced in the first and second dimensions by suitable synchronizing means so that registration of the character information with particular logic circuits which are arranged to provide an output indicative of the character scanned is assured during the shifting of the information through the storage matrix.

The foregoing and other objects, features and advantages of the invention will be apparent from the following more particular description of a preferred embodiment of the invention, as illustrated in the accompanying drawings.

Figure 1:
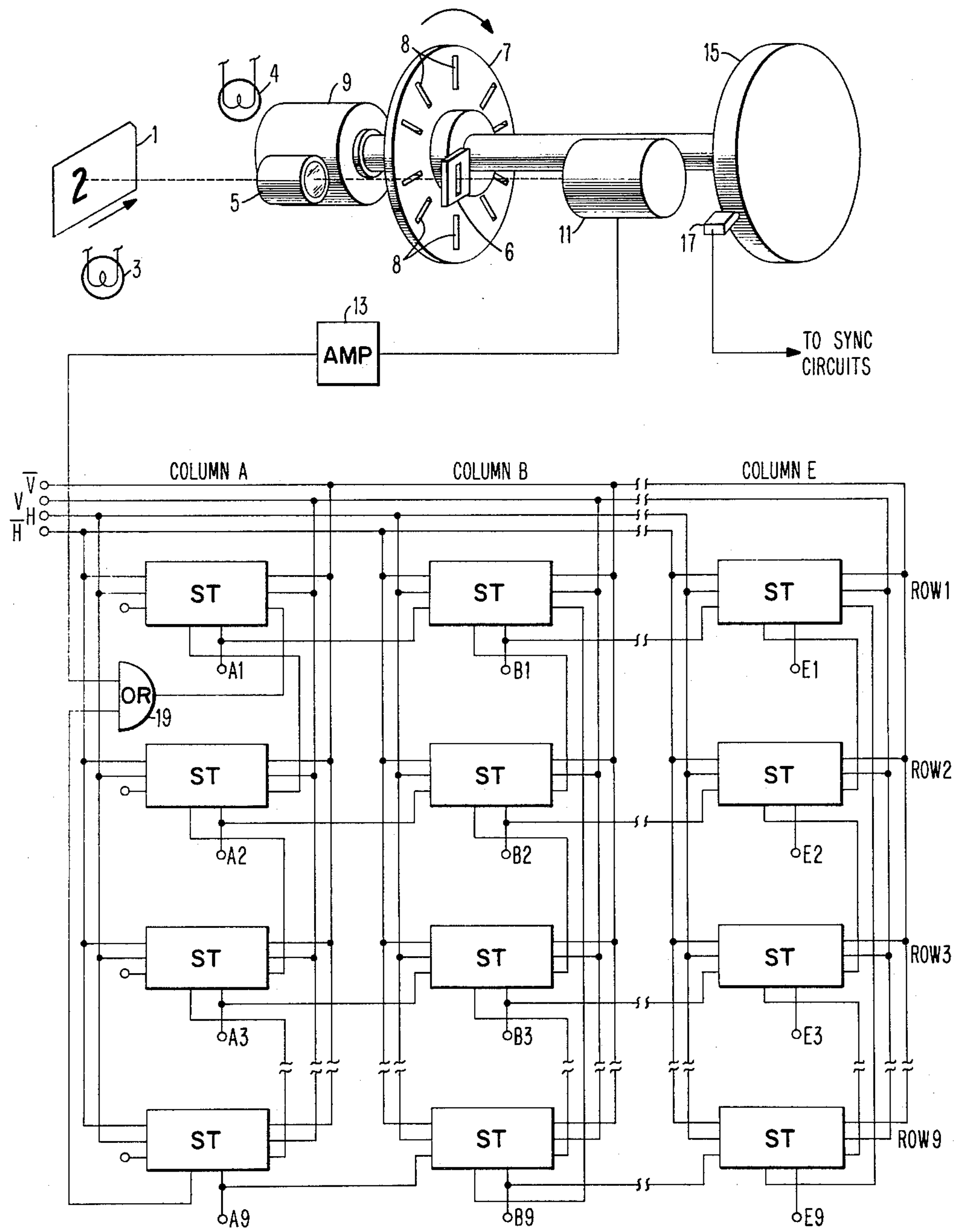
FIG. 1 shows a block diagram of the scanner and shift register used in the present invention.
Figure 3A:
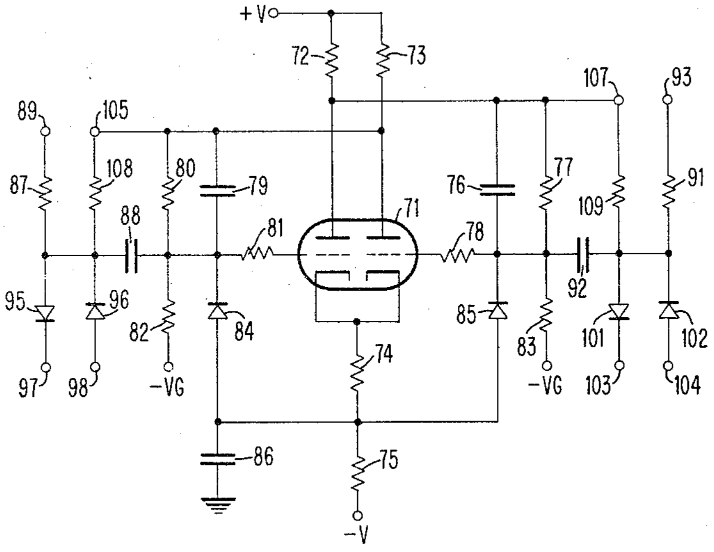
Figure 3B:
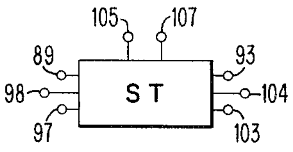

FIGS. 3*a* and 3*b* show the detailed circuit arrangement and the symbolic representation, respectively, of one form of shifting register storage element which may be utilized in the shifting register matrix of FIG. 1.

FIGS. 4*a* through 4*j* show in symbolic representation the character outlines of a set of characters which may be recognized by the system illustrated in the drawings of FIG. 1, and indicate in tabular form the necessary arrangement of the inputs to the diode logic circuits from the shifting register matrix in order to determine whether the associated character has been recognized.

Figure 5:
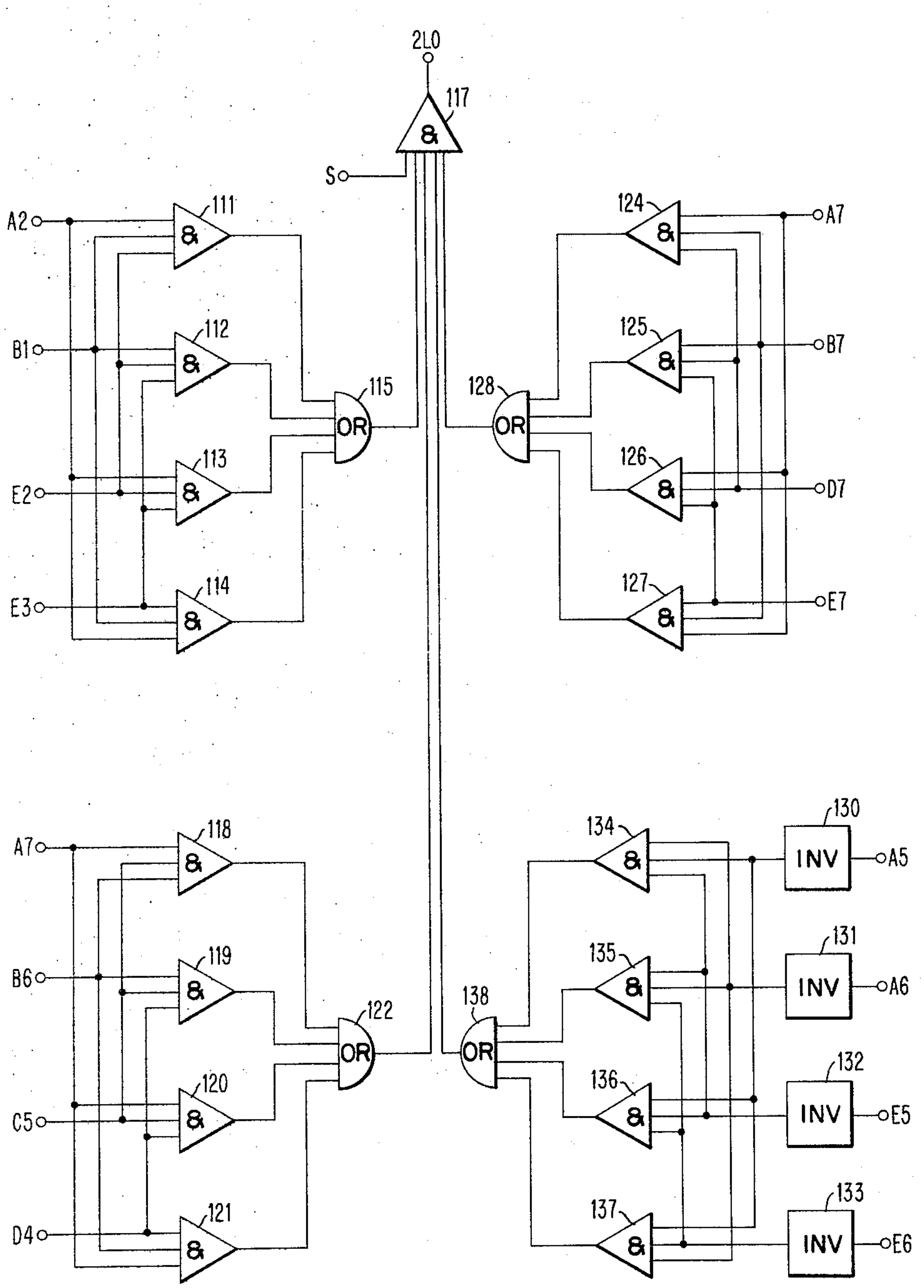

FIG. 5 is a diagrammatic illustration of one of the diode logic circuits utilized for the character recognition system shown in the previous drawings, and illustrates the circuitry employed in decoding the scanning information representing the character 2.

Similar reference characters refer to similar parts in each of the several views.

Referring now to the drawings, FIG. 1 shows a schematic illustration of a system embodying the invention wherein serial optical scanning is employed, together with a form of storage matrix well suited to use with serial information input. The optical scanner is of the well-known rotating disc type, in which the character on a document 1, moving at a constant predetermined speed in a direction indicated by the arrow, is illuminated by a suitable light source such as the lamps 3 and 4. The image of the character is focused by a suitable lens assembly indicated at 5, and broken into a plurality of successive vertical scans by the cooperation of the stationary slit 6 and rotating scanner disc 7 having radial slots 8, the disc being rotated in the direction shown by the arrow at a substantially constant speed, by driving means such as a direct connected motor 9. A suitable photoresponsive device 11, such as a photomultiplier tube is arranged to receive the scanned image and provide suitably amplified scanning information through an amplifier indicated by rectangle 13. Mounted on the scanning disc shaft is a magnetic drum 15, having permanently recorded synchronizing signals on the surface thereof, which are picked up by a sync track reading head 17 and thence supplied to synchronizing circuits arranged substantially in the manner shown in FIG. 2.

In FIG. 1, there is shown a rectangular matrix of bistable storage elements similar to those to be subsequently described in detail in connection with FIGS. 3*a* and 3*b*. The triggers in the matrix shown in FIG. 1 are arranged in rotated positions from the manner in which they are shown in FIG. 3*b*, for the reason that vertical shifting of information stored in the triggers takes place downwardly. Only three columns and four rows of the triggers are shown, but it is to be understood that as many columns and rows may be provided as necessary to provide for the necessary horizontal and vertical resolution of the scanning information. The synchronizing pulses are supplied to the triggers in the matrix by bipolar shift pulse lines, including those connected to terminals V and $\overline{V}$ for the vertical shifting, and the lines connected to terminals H and $\overline{H}$ for supplying the bipolar horizontal shifting pulses. The production of the shifting pulses will be described in detail in connection with FIG. 2. The output from the triggers provided by a horizontal shift operation is supplied from any one trigger in a given row to the next succeeding trigger in the column to the right, and in the same row. Vertical shifting operations shift the operation from any given trigger in a particular column to the next succeeding trigger in the same column and in the next lower row, as may be seen by inspection of the drawing. Except for the first column, the bottom trigger in each column has its vertical output connected back to the vertical input terminal of the trigger in the same column and in the topmost row, and the outputs from the triggers are designated as shown by the coordinate designations of column and row, and are taken from the horizontal output terminal of the shifting register trigger at that point.

In order to enter information into the shifting register matrix, an OR circuit 19 is provided, one input of which is connected to the vertical output of the bottommost trigger in column A, the other input of which is connected to the output of the scanning amplifier 13, with the output of OR circuit 19 being connected to the vertical input circuit of the first shifting register trigger in column A.

In operation, the relation between length of scan, number of elements in the columns of the matrix, and the vertical sync rate, preferably, but not necessarily, is such that the synchronization pulses are supplied to the vertical synchronizing circuits at a number of times equal to an integral multiple of the number of rows in the shift register, such as 2, for each scan through the character, that is, for example, if there are provided six shifting register triggers in each column, then the number of scanning elements in each scan will be equal to 12, and this should also equal the number of vertical shifting pulses supplied to the shift register during a single scan.

In any event, the number of vertical sync pulses must equal or exceed the number of shift register stages per column, and in turn, the number of shift register stages per column must equal or exceed the number of scanning elements in each scan. The horizontal shifting pulses may then be generated in a manner shown in FIG. 2, by providing a horizontal shift pulse following the completion of the required number of vertical shift pulses. In the arrangement shown in FIG. 1, the scanning information from each scan is entered at the top of the first column of the shifting register matrix, and is shifted downwardly, arriving at the lowermost position at a time, for example, halfway through the scan, at which time the information is read out of the lowermost trigger and returned to the topmost or first trigger in the column. Following the second portion of the scanning cycle, in which the input information is again shifted downwardly through the entire shift register, and the information which may have been contained in the shift register is again returned to the feedback circuit to the topmost storage element in the matrix, a horizontal shift pulse is supplied to move all the information in the first column of the matrix to the second column, whereupon the cycle of operation is repeated. At the time the suitable number of vertical scans have been made to scan the entire character width, as shown in FIG. 1, all of the information will have been moved into the shifting register matrix, and thus sometime or other during the total scanning operation the pattern of information in the shifting matrix will match the required combinations set up by diode logic circuits, as shown in FIG. 5, to thereby produce an output indicative of the character scanned.

It is apparent that the arrangement of the shifting register matrix as shown is not limited to use with serial scanning, but may also be used with serial parallel scanning by providing the parallel scanning information in groups, which are fed in parallel to the first column of the matrix in groups which are equal to or less than the total number of storage elements in a column, and which information is repeated for each group of the parallel scanning system. For example, if the storage matrix is arranged so that each column is six elements high, and the parallel scanning elements are twelve in number, then serial-parallel input may be provided to a matrix of the type shown in FIG. 1 by providing inputs to the storage matrix, first from the lower group of six elements in the scanning array, and then from the remaining six elements in the array, at a group rate equal to one-half of the horizontal shift rate. Thus it can be seen that the matrix arrangement shown in FIG. 1 may be employed for serial entry of scanning information, or for serial-parallel entry of scanning information by suitable arrangement of the inputs.

Figure 2:
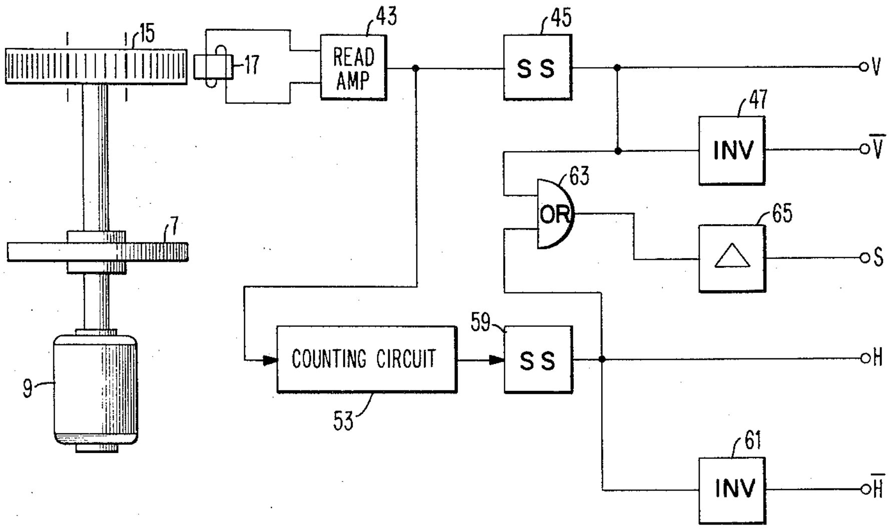
FIG. 2 is a diagrammatic illustration of the synchronizing circuits, utilized with the arrangement of FIG. 1.

FIG. 2 shows a detailed schematic diagram of the synchronizing circuits governed by the magnetic drum 15. As shown in FIG. 2, the sync track head 17 is arranged to have pulses generated therein by the passage of magnetized spots on the drum 15, with the induced pulses being amplified in a suitable read amplifier 43. Each pulse supplied through read amplifier 43 is supplied to the input of a conventional single-shot or monostable multivibrator 45, the output of which is supplied to a terminal designated by the reference character V and which is used for vertical synchronization or driving in the operation of the shifting matrix. The output of the single-shot 45 is also supplied through a conventional inverter circuit 47 to the terminal $\overline{V}$ to serve as the negative portion of the bipolar vertical shifting pulses for the shifting register matrix. The timing or sync pulses read from the drum 15 are additionally supplied from the output of the read amplifier 43 to a counting circuit 53, of any conventional type, adapted to provide one output pulse after a given number of input pulses have been supplied thereto, say, for example, twelve. It can be seen therefore that, for every twelve sync pulses supplied from read amplifier 43, the counting circuit 53 will supply an output pulse. The output pulses from counting circuit 53 are supplied to a single shot 59 for shaping purposes and timing and thence to a terminal H, and through a conventional inverter 61 to a terminal $\overline{H}$. These terminals are connected to the bipolar synchronizing lines for horizontal shifting in the shift matrix to be described.

For the operation of the logic circuits to be described later, there is provided a sampling pulse which is obtained by combining the outputs from the terminals H and V in an OR circuit 63, which is then fed through a suitable type of delay unit 65 to a terminal S, this designation being adopted since the pulse is considered to be a sample pulse.

From the foregoing it can be seen that the shifting register will be provided with suitably timed and related horizontal and vertical synchronizing or shifting pulses as a result of the operation of the sync track on the drum 15 which, of course, is mechanically synchronized with the scanning of the character-bearing document having characters to be recognized thereon. Thus, the scanning of the characters to be recognized with respect to the sensing or scanning elements is synchronized with the remainder of the system.

Although a number of arrangements may be employed for the storage elements, one particular arrangement especially useful in the present invention is shown in FIGS. 3*a* and 3*b*, FIG. 3*a* showing a schematic illustration of the circuits found within the element, and FIG. 3*b* showing the symbolic illustration of the element to correlate the connections thereto with the showing in FIG. 1.

In FIG. 3*a*, the reference character 71 designates a twin triode, the anodes of which are connected through resistors 72 and 73 to a suitable source of relatively positive direct current potential and the cathodes of which are connected together and through a pair of common cathode resistors 74 and 75 to a source of relatively negative potential —V. The anode of each triode section is connected to the opposite grid through a cross-coupling network such as the capacitor 76 and resistor 77 connected between the left-hand anode and grid of the right-hand triode section, a suitable current limiting resistor 78 being interposed between the network and the grid. Likewise, the right-hand anode is connected to the left-hand grid through the circuit including capacitor 79 and resistor 80 connected in multiple and through the limiting resistor 81. The grids of both sections are connected to a source of bias potential —VG via resistors 82 and 83 and are provided with diode clamps 84 and 85, which are connected to the junction between resistors 74 and 75, and are bypassed to ground potential by a capacitor 86.

The inputs are identical for both sides of the circuit and comprise a resistor and capacitor connected in series between the input terminal and the current limiting resistor, such as resistor 87 and capacitor 88 connected in series between input terminal 89 and the grid limiting resistor 81, for the left-hand side of the circuit, and resistor 91 and capacitor 92 connected in series between input terminal 93 and the grid limiting resistor 78. Each input circuit also has connected thereto a pair of diodes such as the diodes 95 and 96 connected to terminals 97 and 98 on the left-hand side of the circuit, and diodes 101 and 102 connected to terminals 103 and 104 on the right-hand side of the circuit.

Output terminals 105 and 107 are connected to the anodes of their respective triode sections as shown, and are also connected via resistors 108 and 109 respectively to the input circuit of the opposite section of the trigger.

The terminal 97 and 98 of each of the triggers in the matrix are connected to the terminals $\overline{V}$ and V respectively of the synchronizing circuits described in connection with FIG. 2, while the terminals 103 and 104 of each of the triggers in the shifting register matrix are connected to the terminals $\overline{H}$ and H respectively of the synchronizing circuits shown in FIG. 2. These connections are indicated in FIG. 1 for the triggers shown therein.

The circuit shown in FIG. 3*a* is similar to that shown and described in FIG. 8 of a copending application for Letters Patent of the United States, Serial No. 469,895, filed on November 19, 1954, by G. L. Clapper, now U.S. Patent 2,988,701, and reference may be had to this patent for a detailed explanation of the construction and operation of the trigger. It is deemed sufficient to point out in the present application that the parts are proportioned and arranged so input information supplied to one side or the other of a trigger in the matrix may be shifted to the next trigger connected to the output of the stage in question either in a horizontal or a vertical direction in accordance with the supply of horizontal or vertical synchronizing pulses to the synchronizing circuits which are connected to each trigger in the matrix.

Accordingly, by suitably relating the horizontal and vertical synchronizing pulses, it is possible to enter information into the shifting register matrix from the amplifier circuits and thereafter to move this information through the matrix in various directions, so that the information supplied from the scanning element can be shifted about within the register through various alignments. Thus it is possible to shift the scanning information within the shifting register matrix in such a manner that the information is reassembled in what amounts to a positionally correct representation of the scanning information, and by providing suitable circuits which detect the existence of combinations of information at different locations within the matrix, to define the character scanned.

To accomplish this, each of the triggers within the matrix is provided with a suitable output terminal, herein identified by the column and row coordinates, which is connected to suitable diode logic circuits which define certain combinations that can exist therein when a particular character has been scanned. The function of the shifting matrix therefore is to position the scanning information in such a manner that, when the scanning information represents a particular character to be recognized, it will be moved into a position wherein the outputs of the various positions within the shifting register matrix will form a combination which can be recognized by the output logic and thereby provide an output signal indicative of that character.

Since the characters to be scanned are considered to occupy a matrix which may be divided into five columns and which are considered to occupy a maximum height of nine rows including extraneous information, it will be apparent that a character which is scanned in such a manner that the information therefrom is entered in the leftmost column of the shift register is thereafter moved by the shifting register so that, at some time or other during the shifting operation, the character will come into alignment in such a manner that the scanning information stored in the triggers of the shifting register matrix will correspond geometrically to the character scanned. The output logic circuits connected to the various elements in the shifting register matrix will have the necessary inputs supplied thereto and accordingly will produce an output indicative of this character during the time that the sample pulse, S, is available.

The manner in which the pattern of information stored in the shifting register matrix may be utilized for determining a character scanned is illustrated in the series of drawings, FIGS. 4*a* through 4*j*. In these figures, there is shown at the left-hand side of each figure a pattern laid out in coordinates corresponding to the coordinates of the storage matrix, with the shape of a numeral in the series from 0 to 9 superimposed. The characters are laid out in the manner which may be produced by matrix or wire printing in which the characters are formed by a combination of small segments, such as dots, into a pattern which forms a total character. For example, in FIG. 4*a* there is shown the pattern for the numeral "2." It will be seen that a character formed in accordance with this pattern, when scanned, will supply information to the storage register matrix in such a manner that, when shifted through the matrix, certain of the storage elements will contain information in the positions corresponding to the coordinate designations by rows and columns in FIG. 4*a*. That is, a positive signal output will exist at the storage elements at locations A2, B1, C1, D1, E2, E3, D4, C5, B6, A7, B7, C7, D7 and E7.

Each of the remaining numerals may be analyzed in a similar fashion, and it will be apparent that for each of the numerals shown there will exist unique combinations of information in the storage matrix when the numeral is brought into registration by the shifting action of the shifting register.

It then remains to provide suitable means for detecting such unique combinations as define the characters to be recognized. Although a number of combination may be arrived at, the present disclosure shows the use of combinations of three out of four conditions, using the presence of information in predetermined locations, and as a check against ambiguity, the absence of information at other specified locations. These conditions are set forth in the tables to the right of each of the character representations, in which tables the first column to the left indicates the reference number of the black or white conditions which are to be employed and the succeeding four columns shown which information is to be combined to designate the presence or absence of information. For example, in FIG. 4*a*, three black combinations are shown, designated 1B, 2B and 3B, and one combination of white conditions designated as W. In the first set, 1B, the conditions in the first row are A2, B1, E2 and E3. In other words, one of the combinations which must be satisfied for the recognition of a character "2" is that information be present in the form of an output from the storage element in locations A2, B1, E2 and E3 in any combination of three out of four. The second requirement is that three out of four of the conditions A7, B6, C5 and D4 must be present. The third condition is that three out of four of the conditions A7, B7, D7 and E7 must be present. The fourth set of conditions is that there must be no black information at three out of four of the locations A5, A6, E5 and E6. If all four of these sets of conditions are met during the time that information is being shifted through the shifting register matrix, it is considered that the information within the matrix at that time indicates that a character "2" has been scanned.

These combinations of conditions are detected by the means of suitable logic circuits, one for each character to be recognized, and an example of which is shown in FIG. 5 of the drawings. The logic circuits shown in FIG. 5 of the drawings are those required for the detection of the combinations which indicate that a figure "2" has been scanned. Referring to FIG. 5, there are shown four groups of logic circuits which may be made up of the usual diode circuitry well known in the electronic calculator art, in which an AND function is indicated by a triangle and an OR function is indicated by a semicircle, one such combination of four AND circuits and one OR circuit being provided for each of the four sets of conditions which must be met for the recognition of the numeral "2." Thus, at the left-hand side of the drawing, there are shown four AND circuits designated by the reference characters 111 through 114, the outputs of which are combined in an OR circuit 115. The four AND circuits 111 through 114 each have three inputs, so that all of the combinations of three out of four conditions which exist for the first combination of black information are determined by the circuits. For example, the AND circuit 111 provides an output when the conditions A2, B1 and E2 are obtained. The AND circuit 112 provides an output when the shifting register contains information at locations B1, E2 and E3. The AND circuit 113 provides an output when the conditions E2 and E3 and A2 are met, and the AND circuit 114 provides an output when the conditions E3, A2 and B1 exist. Thus, all possible combination of three out of four of the conditions required in row 1B of the table shown in FIG. 4*a* are provided for with these logic circuits.

If any one of these three out of four conditions exist, then an output is provided from the OR circuit 115 to one input of an AND circuit 117, which AND circuit requires for its output the presence of an output from each of the other three combination circuits and additionally requires the presence of a delayed sample signal S, from the synchronizing circuits.

Figure 4A:
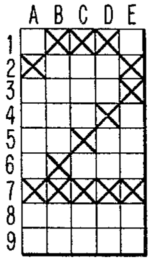
Figure 4B:
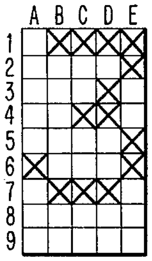
Figure 4C:
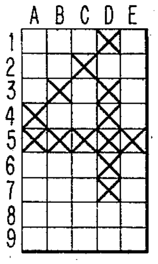
Figure 4D:
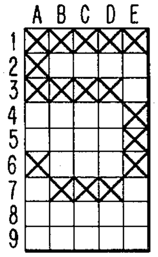
Figure 4E:
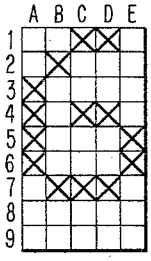
Figure 4F:
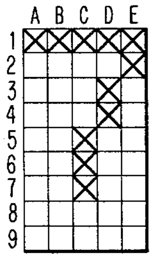
Figure 4G:
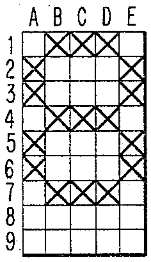
Figure 4H:
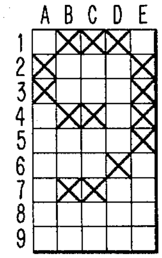
Figure 4I:
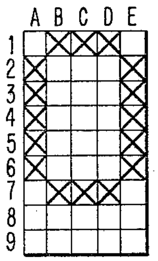
Figure 4J:
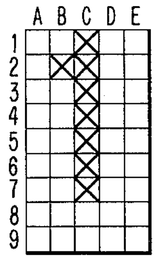

The AND circuits 118 through 121 respectively have their outputs connected to OR circuit 122 and detect any of the possible three out of four combinations defined by row 2B of the table of FIG. 4*a*. The AND circuits 124 through 127 respectively supply their outputs through OR circuit 128 to AND circuit 117 and detect any of the possible three out of four combinations defined by row 3B of table of FIG. 4*a*. It will be recalled that, in order to avoid ambiguities, the absence of information must be checked at predetermined locations within the shifting register matrix, and as shown in FIG. 4a, these conditions are defined by the rows designated by the letter W with or without numerical prefiixes. Since the presence of no black information at a predetermined location is equivalent to the negative of information present at a particular location, these conditions are checked by inverting the outputs of the storage triggers at the designated locations and thereafter supplying the inverted outputs to suitable AND and OR circuits. Thus, in FIG. 5, the trigger outputs A5, A6, E5 and E6 are supplied through inverters 130 through 133, respectively, to the AND circuits 134 through 137, the outputs of which are combined in an OR circuit 138 and supplied to the final AND circuit 117.

From the foregoing, it will be apparent that, when the conditions set forth in the table associated with FIG. 4a are met by the scanning information as it is progressively advanced through the storage matrix, an output signal will be supplied from the terminal 2L0 of AND circuit 117, indicating that a character "2" has been scanned.

Because erroneous outputs from the logic circuits might occur during the shifting operation, the final AND circuits in the logic, such as 117, are enabled to provide an output only when a sample pulse, S, is present. This pulse, provided for each horizontal or vertical shift pulse, is delayed by the delay unit 65 of FIG. 2, for a sufficient time interval to permit the triggers in the shifting register matrix to change state before sampling the recognition logic.

Similar logic circuits are utilized for the detection of each of the remaining characters shown in the tables, and it will be obvious to those skilled in the art, that not only can additional logic circuits be provided for the detection of characters other than those shown, but that other combinations of logic circuits may be used to detect characters having different shapes as represented by different type fonts. It should be noted in connection with the numerals "7" and "1," that there is a preponderance of white information present in the matrix when the numeral is in proper registration for recognition. Because of this fact, the table of combinations for the numeral "7," shown in FIG. 4f, includes two rows which show combinations of white conditions rather than a single row as shown in the remaining tables, and in the case of the numeral "1," the table of FIG. 4j indicates that three rows of combinations of white information are utilized in addition to two rows of black information, as constrasted with the usual use of three rows of black information and one row of white information. It should also be noted in the case of the numeral "1," that five sets of combinations are provided rather than four as done in the case of the other numerals, however, the philosophy behind the logic circuits is similar to that described in connection with FIG. 5, and the provision of tables of combinations such as shown in FIGS. 4a through 4j will enable one skilled in the art to readily design suitable logic circuits for recognizing any of the numerals defined in these drawings.

From the foregoing, it can be seen that a character sensing system in accordance with the present invention will be characterized by high speed of operation, because of the use of electronic techniques and circuitry and by relative economy, since a relatively large area can be scanned for characters with a relatively small amount of apparatus. These results are obtained by use of a suitable matrix arranged to shift the scanning information through the matrix so that, despite misalignment of charters, the scanning information will be rapidly shifted through positions which determine the character scanned.

In the light of all of the foregoing description, it can be seen that the present invention provides a high speed character recognition system, characterized by the relative economy in parts, which is capable of accepting scanning information involving relatively large misalignment tolerances, and providing output signals indicative of the characters scanned anywhere within this misalignment tolerance.

While the invention has been particularly shown and described with reference to a preferred embodiment thereof, it will be understood by those skilled in the art that various changes in form and details may be made therein without departing from the spirit and scope of the invention.

What is claimed is:

1. In a character recognition system, in combination, scanning means for serially scanning a character to be recognized in a plurality of scans,
a shift register comprising a plurality of bistable storage elements arranged in a 2-dimensional matrix comprising a plurality of columns and rows,
synchronizing means connected to said shift register and governed by said scanning means effective to advance information contained in said storage elements step by step in a first dimension of said matrix in synchronism with the operation of said scanning means, and to advance information in said matrix in the other dimension at a submultiple of the rate of shifting in said first direction,
circuit means connecting said scanning means to said shift register to supply scanning information to said shift register, and
logic circuit means, one for each character to be recognized, connected to predetermined storage elements in said shift register to produce an output signal when the pattern of information in said shift register corresponds substantially to the associated character to be recognized.

2. In a character recognition system, in combination, scanning means for serially scanning a character to be recognized in a plurality of scans, each such scan being effective to scan an incremental area sufficiently long to completely scan a character of maximum height disposed anywhere within a maximum misalignment tolerance,
means synchronized with said scanning means for providing first synchronizing signals at a predetermined rate during each scan and for providing second synchronizing signals at a submultiple of the rate of said first signals,
a shift register comprising a plurality of bistable elements arranged in a matrix of columns and rows and connected to said synchronizing means so that information in said shift register is advanced row by row in step with said scanning and column by column after each scan,
means for supplying scanning information to the first of said elements in the first column of said register during a scan, and
logic circuit means, one for each character to be recognized, connected to a predetermined combination of said storage elements and effective to provide an output signal indicative of the scanning of a predetermined character when the information stored in said predetermined combination of storage elements signifies the scanning of said predetermined character.

3. In a character recognition system, in combination, scanning means for serially scanning each character to be recognized by a plurality of successive scans and producing scanning signals when portions of the character are scanned,
a 2-dimensional shift register comprising a plurality of storage elements arranged in a matrix of columns and rows,
means for supplying said scanning signals from said scanning means to the first element in the first column of said matrix, means synchronized with said scanning means for advancing the information stored in said shift register row by row in synchronism with the progression of scanning through the scanning area, means synchronized with said scanning means for advancing the information stored in said shift register column by column following the completion of each of said scans, and logic circuit means, one for each character to be recognized, connected to predetermined storage elements in said shift register to produce an output signal when the pattern of scanning information in said shift register corresponds to the scanning of the associated character to be recognized.

4. In a character recognition system, the combination comprising:

scanning means for serially scanning characters to be recognized in a plurality of successive scans and producing scanning signals when portions of the character are sensed, a 2-dimensional shift register comprising a plurality of storage elements arranged in columns and rows, circuit connections for connecting the storage element in each row and each column to the next succeeding element in the adjoining row and adjoining column, first synchronizing means for supplying vertical shifting control pulses to each of said storage elements to shift the information therein from row to row in step with the progression of each of said scans, second synchronizing means for supplying horizontal shifting control pulses to each of said storage elements to shift the information therein from column to column following a predetermined number of vertical shifting pulses, and logic circuit means, one for each character to be recognized, connected to predetermined storage elements in said shift register to produce an output signal when the pattern of scanning information in said shift register corresponds to the scanning of the associated character to be recognized.

5. In a character recognition system, in combination, scanning means for serially scanning characters to be recognized in a plurality of successive scans and producing scanning signals when portions of the character are sensed, a 2-dimensional shift register comprising a plurality of storage elements arranged in columns and rows, means for supplying said scanning signals from said scanning means to the first element in the first column of said matrix, means synchronized with said scanning means for advancing the information stored in said shift register row by row at a rate which is a multiple of the scan time rate for an individual one of said scans, means synchronized with said scanning means for advancing the information stored in said shift register column by column upon the completion of each of said scans, and logic circuit means, one for each character to be recognized, connected to predetermined storage elements in said shift register to produce an output signal when the pattern of scanning information in said shift register corresponds to the scanning of the associated character to be recognized.

References Cited by the Examiner

UNITED STATES PATENTS

| | | | |
|---|---|---|---|
| 3,065,457 | 11/1962 | Bailey ---------- | 340—146.3 |
| 3,104,369 | 9/1963 | Rabinow et al. ----- | 340—146.3 |
| 3,104,370 | 9/1963 | Rabinow -------- | 340—146.3 |
| 3,105,956 | 10/1963 | Greanias et al. ---- | 340—146.3 |
| 3,164,806 | 1/1965 | Rabinow -------- | 340—146.3 |

MALCOLM A. MORRISON, *Primary Examiner.*